United States Patent

[11] 3,614,012

[72] Inventors Robert I. Edelman
 Rochester;
 Evan A. Edwards, Pittsford, both of N.Y.
[21] Appl. No. 25,864
[22] Filed Apr. 6, 1970
[45] Patented Oct. 19, 1971
[73] Assignee Eastman Kodak Company
 Rochester, N.Y.

[54] ELIMINATION OF BACKING PAPER SHORTAGE IN ROLL FILM CARTRIDGES
 9 Claims, 6 Drawing Figs.
[52] U.S. Cl. ................................................. 242/71.2,
 242/55, 95/31
[51] Int. Cl. ................................................. G03b 1/04
[50] Field of Search ........................................ 242/71.2,
 71.3, 71.4, 71.1, 55; 95/31

[56] References Cited
UNITED STATES PATENTS
| | | | |
|---|---|---|---|
| 1,527,285 | 2/1925 | Thalhammer | 242/71.4 X |
| 2,740,341 | 4/1956 | McCune | 95/31 X |
| 3,138,084 | 6/1964 | Harvey | 242/71.2 X |

Primary Examiner—Stanley N. Gilreath
Assistant Examiner—Gregory A. Walters
Attorneys—Robert W. Hampton and D. Peter Hochberg ABSTRACT: In a double compartment-roll film cartridge loaded with a length of paper-backed film adapted to be wound from a supply roll in a film supply chamber onto a rotatable winding core in a film takeup chamber, the minimum effective diameter of the winding core is at least as large as the maximum diameter of the film supply roll defined by the internal size of the supply chamber This arrangement avoids the occurrence of film buckling in the exposure gate attributable to the development of more film than paper between the film supply and takeup rolls as a result of the unequal rate at which film and paper are unwound and absorbed by those respective rolls during the film-winding process.

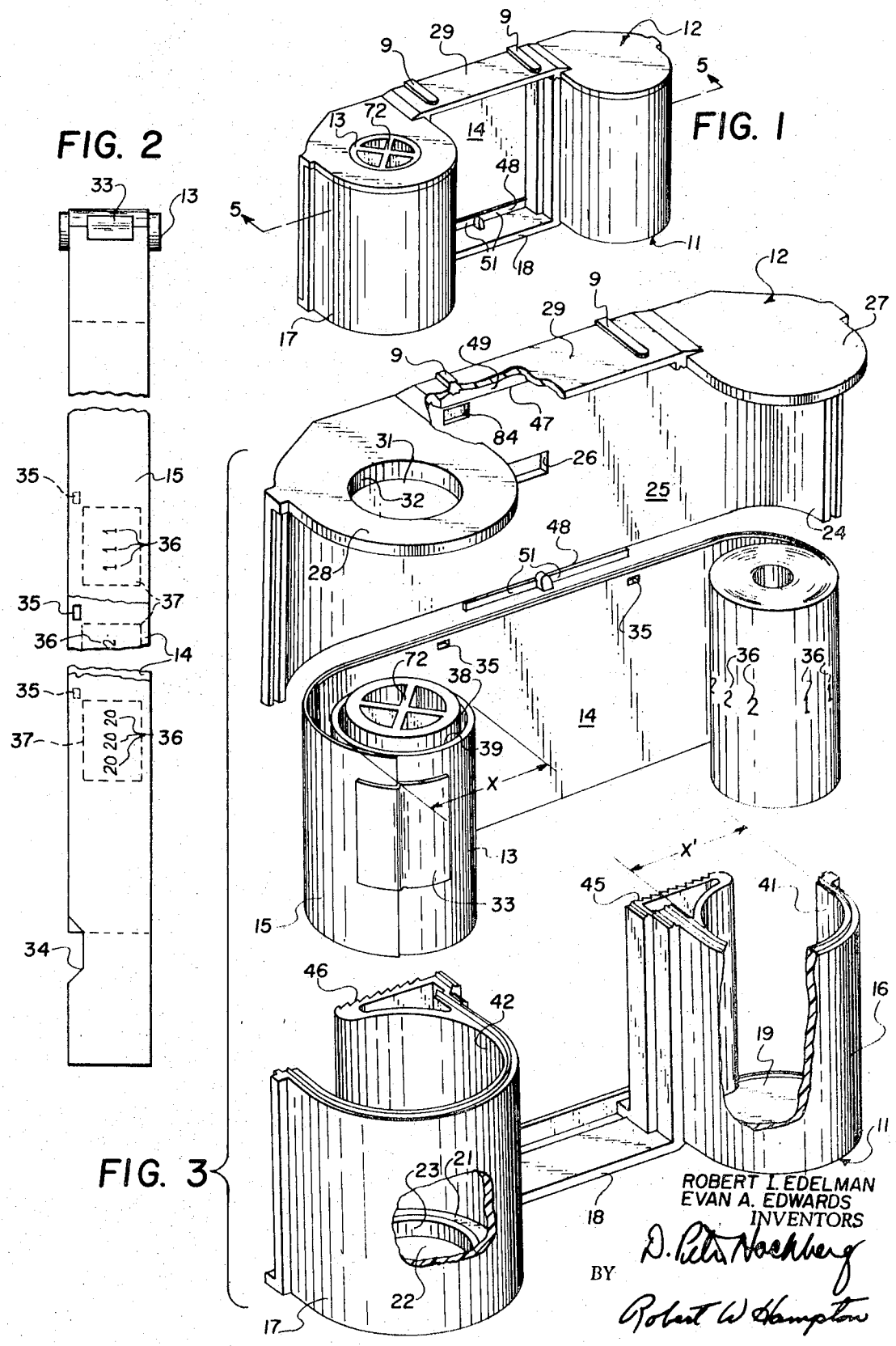

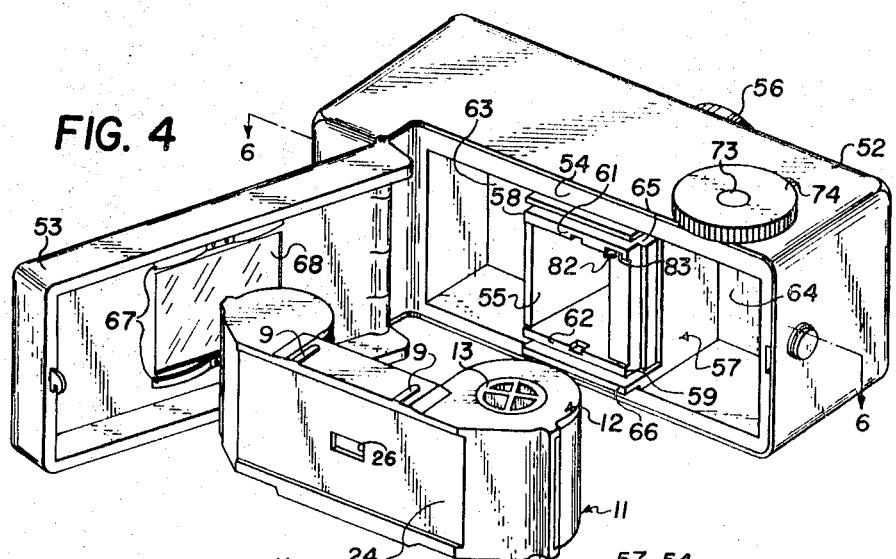
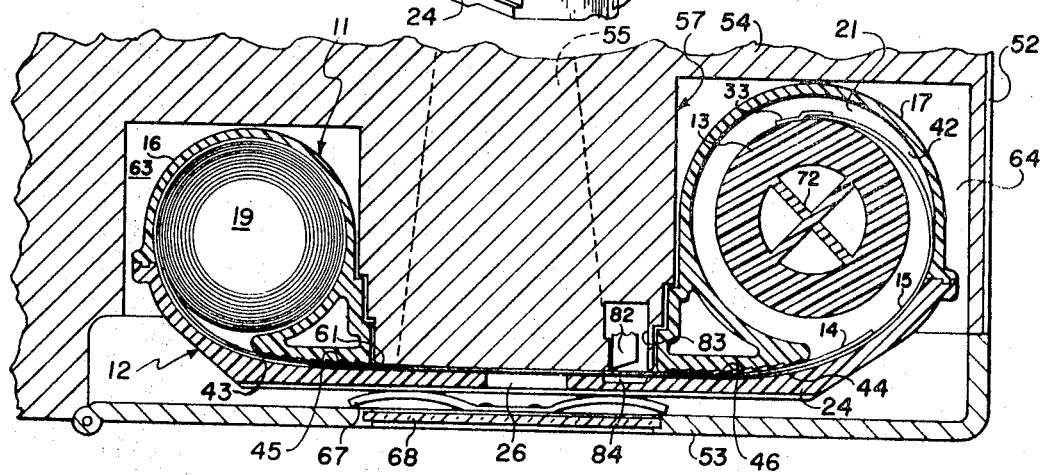
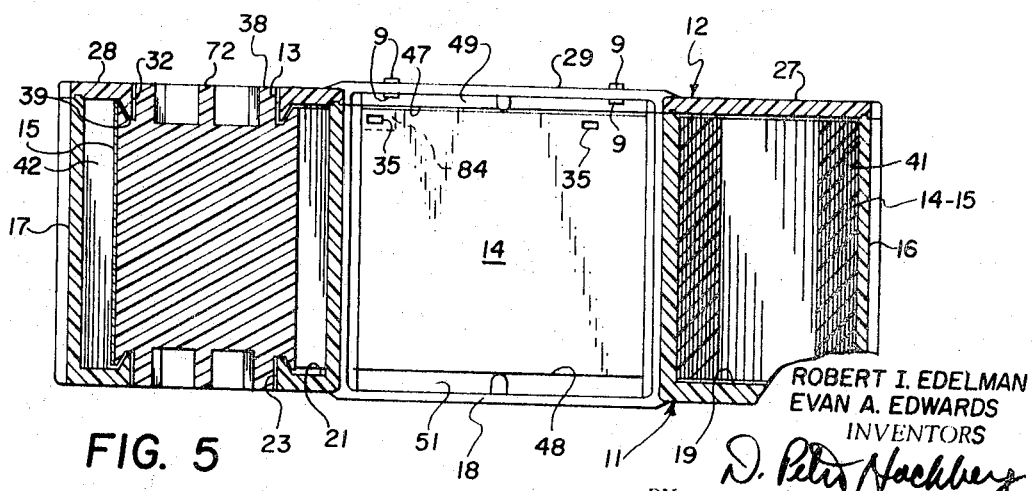

ELIMINATION OF BACKING PAPER SHORTAGE IN ROLL FILM CARTRIDGES

BACKGROUND OF THE INVENTION

1. Field of the Invention

The present invention relates to magazine or cartridge loaded still cameras employing paper-backed roll film, and more specifically to double compartment roll film cartridges for use in such cameras. Still more particularly, the invention concerns improving such cartridges to eliminate the occurrence of film buckling attributable to the development of more film than paper between the film supply and takeup rolls as a result of the unequal rate at which film and paper are unwound and absorbed by those respective rolls during the film-winding process.

2. Description of the Prior Art

In a typical camera adapted to be loaded with conventional spools of paper-backed film, the film and paper are unwound intermittently from a supply roll and are wound onto a substantially identical takeup spool. Between the two spools, the film and backing paper are supported by a gate structure, thereby positioning successive film exposure areas in coincidence with a focal plane of the camera lens system. Since the winding and unwinding radii of the outermost convolutions of backing paper on the respective takeup and supply rolls are slightly greater than the corresponding radii of the outermost film convolutions, each revolution of the supply spool produces somewhat more paper than film while each revolution of the takeup spool absorbs somewhat more paper than film. If the outermost convolutions of film and paper on the two rolls are considered as being cylindrical, which can be assumed for practical purposes, it will be apparent that the additional amount of paper unwound by each revolution of the supply spool is equal to the additional amount of paper wound onto the takeup spool by each revolution thereof, regardless of differences in the external radii of the respective rolls. However, since the supply roll initially is larger than the takeup roll but later becomes smaller than the takeup roll, the corresponding difference between the speeds at which the two rolls revolve can produce a shortage of paper between those rolls during the initial stage of the winding operation because the smaller takeup roll winds paper at a faster rate than that at which paper is unwound from the supply roll. Thereafter, a surplusage of paper is produced because the smaller supply roll dispenses paper at a rate faster than that at which it is wound on the takeup roll. When surplus paper is present between the rolls, it can be accommodated readily in the film chambers in which the rolls are housed, and the advancing film can slide over any accumulated paper without difficulty. However, a surplusage of film must be absorbed between the film rolls but beyond the film gate to prevent bucking of film in the exposure area. In conventional spool-loaded cameras, such a surplusage of film between the rolls is not particularly objectionable inasmuch as adequate room is usually available to allow the film to buckle slightly at a location between the film gate and one of the film supply rolls. Furthermore, in such cameras it is often possible to separate the supply and takeup spools by a considerable distance, whereby enough surplus paper is developed between the two rolls as the leading end of the film is initially wound between the supply roll and the takeup roll to prevent the existence of a paper shortage during the subsequent phase of the winding operation.

In a roll film cartridge loaded with paper-backed film, for example, the well-known film cartridge disclosed in commonly assigned U. S. Pat. No. 3,138,081, and sold by the assignee of the present invention under the trademark KODAPAK, the compact size of the cartridge housing dictates that both film rolls be closely adjacent the corresponding ends of the film exposure gate defined by the cartridge; thereby eliminating sufficient room to absorb surplus film between the film rolls and the gate area and also severely limiting the distance through which the leading end of the film can move between the rolls to generate an initial surplus of paper. Accordingly, as disclosed in commonly assigned U.S. Pat. No. 3,138,084, the effective diameter of the film winding core in such a magazine is larger than the internal diameter of the supply roll by an amount just sufficient to cause the external diameters of the two rolls to become equalized during the first half of the winding operation while surplus paper is still available as a result of the initial movement of the leading end of the film between the two film rolls. During the second half of the winding operation, more paper is dispensed than is taken up, so no paper shortage problem exists. As explained in greater detail in the patent just-mentioned above, the film supply roll is wound on itself in the corresponding chamber of the cartridge, rather than being wound onto a frictionally supported spool or winding core. Therefore, the film supply roll may tend to expand within the confines of the film supply chamber. However, since the friction between the film and paper within the supply roll normally is sufficient to prevent relative longitudinal sliding thereof, such expansion is limited only to the outer convolutions of film and paper comprising the supply roll. Consequently, the expanded outermost supply roll convolutions comprise the same amounts of excess paper as did the corresponding original convolutions prior to such expansion; thereby producing the same result as if the supply roll remained tightly wound.

While the above-described means for avoiding backing paper shortage has proven to be effective in the aforementioned KODAPAK cartridge under normal operating conditions, it has been found that relative slippage may occasionally occur between the entire lengths of the film and paper within the supply roll, thus allowing the entire supply roll to expand. This occurrence, known as "clockspringing," may be brought about, for example, by excess vibration of the cartridge, particularly before the film has aged sufficiently in the supply chamber to reduce the tendency of its convolutions to expand. Such relative sliding of the film and paper, of course, destroys the required relation between the amount of film and paper delivered from the supply roll as it is unwound. To avoid this rather remote but nevertheless potentially harmful phenomenon, British Pat. No. 1,112,349 is directed to providing the film supply chamber of such a cartridge with a resilient member adapted to apply a yieldable squeezing force to the periphery of the supply roll to prevent it from expanding as it is unwound. Such an arrangement, however, accomplishes its objective only at the expense of adding at least one additional component to the cartridge and at the same time reducing the capacity of the supply chamber.

Even if relative slippage between the film and paper can be eliminated entirely in a cartridge employing the above-described means for avoiding backing paper shortage, other limitations inherent in such means preclude its employment in certain types of cartridges. For example, in the cartridge disclosed in commonly assigned U. S. Pat. Applications Ser. Nos. 025,848 and 025,956, entitled "Film Cartridge and Camera Employing Same," and "Film Cartridge and Apparatus Using Same," and filed respectively in the names of Hubert Nerwin and Evan Albert Edwards on even date herewith, the filmstrip is physically unattached to the backing paper, and is moved between the film chambers with the paper only by virtue of frictional contact therewith. Therefore, before the leading end of the film reaches and becomes engaged with the winding core, it is likely to slide relative to the paper, thus precluding the development of an initial surplusage of paper between the two rolls to make up for the deficiency in paper supplied during the advancement of the first half of the film to the takeup chamber. Furthermore, the film gate between the two film chambers of such a cartridge is defined in part by the cartridge structure and in part by the camera in a manner such that the portion of the film between the two chambers is not supported in an anterior direction when the cartridge is removed from the camera. Since the leading end of the filmstrip otherwise might fail to enter the film passageway leading into the film takeup chamber, this construction dictates that the film extend initially between the two chambers and into that passageway. Hence, even if the frictional contact between the paper and the leading end of the film were sufficient to prevent relative slippage therebetween, the relatively small distance by which the leading end of the film is spaced initially from the winding core is insufficient to develop any appreciable paper surplusage before the film starts to wind onto the core.

SUMMARY OF THE INVENTION

The present invention is directed to eliminating backing paper shortage in a double-compartment roll film cartridge or magazine notwithstanding the possible existence of relative slippage between the film and its backing paper, and without regard to the initial proximity of the leading end of the film to the takeup spool or core. Briefly, this is accomplished in accordance with the present invention through the extremely simple but heretofore unobvious expedient of providing the film takeup chamber with a winding core of sufficient diameter to insure that the diameter of the innermost film convolution wound thereon is at least as large as that of the outermost film convolution that can be accommodated in the film supply chamber. By this means, since the winding radius of the takeup roll is always larger than the unwinding radius of the supply roll, each revolution of the winding core produces at least one revolution of the supply roll; thereby insuring that extra paper is at all times present between the two rolls notwithstanding the absence of an initial paper surplusage or the possibility of relative slippage between the film and paper. In other words, since more paper is dispensed from a smaller diameter supply roll rotating at a higher speed than is taken up by the larger diameter core having a lesser angular velocity, no paper shortage can result.

Other features and advantages of the invention will be apparent from the following description of an illustrative preferred embodiment thereof comprising a film cartridge or magazine of the type disclosed in the above-identified pending U.S. applications, reference being made to the accompanying drawings in which like reference numerals refer to like elements.

BRIEF DESCRIPTION OF THE DRAWINGS

In the drawings:

FIG. 1 is a perspective front view of a film cartridge comprising an illustrative preferred embodiment of the invention;

FIG. 2 is a plan view of the film assembly employed in the cartridge shown in FIG. 1;

FIG. 3 is an enlarged exploded front perspective view of the film cartridge shown in FIG. 1 with portions of the cartridge structure depicted broken away;

FIG. 4 is a rear perspective view of an open camera according to the illustrative preferred embodiment of the invention and of the film cartridge illustrated in the preceding figures in position for insertion into the camera;

FIG. 5 is a cross-sectional view taken along the line 5—5 in FIG. 1; and

FIG. 6 is a cross-sectional partial plan view of the loaded camera taken through the camera and cartridge along the line 6—6 of FIG. 4.

DESCRIPTION OF THE ILLUSTRATIVE PREFERRED EMBODIMENT

By reference to FIGS. 1—5, it will be seen that the subject film cartridge or magazine comprises a lower casing member 11, an upper casing member 12, a film winding core 13, an elongate strip of film 14 and a strip of opaque protective backing paper 15. The lower casing member is formed of molded plastic and includes a film supply compartment member 16 and a film takeup compartment member 17, joined together by a lower wall member 18. As shown at numeral 19, the lower end of the film supply compartment member is entirely closed by an end wall member; whereas a similar end wall member 21 at the lower end of the film takeup compartment member is provided with a central opening 22 surrounded by inwardly projecting lip 23. The upper casing member is also formed of molded plastic material and comprises a relatively thick backwall member 24 curved forwardly toward its opposite ends from a flat forwardly facing back film gate surface 25 surrounding a rectangular aperture 26. Cover members 27 and 28, adapted to close the upper ends of the respective film supply and takeup compartment members, extend forwardly from the top edge of the backwall member and are joined by upper wall member 29 corresponding to lower wall member 18. As in the case of the lower compartment end walls, cover member 27 is entirely imperforate whereas cover member 28 is provided with an opening 31 surrounded by an inwardly projecting lip 32. A plurality of pads 9 are provided on the inner and outer surfaces of upper wall member 29, for engaging corresponding camera structure (not shown) to position the magazine therein when it is loaded in a camera.

As depicted in FIGS. 2 and 3, the film assembly employed in the subject cartridge comprises the cylindrical molded plastic winding core 13, to which the leading end of the elongate strip of protective backing paper 15 is attached by a piece of pressure sensitive tape 33 or other appropriate means. Filmstrip 14 is superimposed along the backing paper with its leading end adjacent the winding core and with its trailing end partially overlapping edge notch 34 in the backing paper. Along its upper edge, the filmstrip is provided with a series of uniformly spaced metering holes 35 in alignment with the backing paper notch 34. Similarly spaced reference numerals 36 are also provided along the back surface of the backing paper behind the corresponding film exposure areas indicated in broken lines at 37.

When the cartridge is assembled, the adjacent surfaces of the upper and lower casing members are sealed together in light tight relation to one another as described in greater detail in commonly assigned copending U. S. Pat. application Ser. No. 25,848. The winding core 13, which is symmetrical at both ends, is rotatably supported in the film takeup chamber by the reception of its upper end hub 38 in opening 31 of the upper casing member and by the similar reception of its lower hub in opening 22 of the lower casing member. The corresponding opposed inwardly facing lips 32 and 23 surrounding these openings are received in mating annular grooves in the hub member as shown at numeral 39 in FIGS. 3 and 5, thereby providing labyrinth light barriers. Accordingly, it will be seen that this construction provides substantially cylindrical film supply and takeup chambers 41 and 42 which are completely light tight except along the film passageways shown at 43 and 44 in FIG. 6; such passageways being defined between the rearwardly facing transversely serrated wall surfaces 45 and 46 of the lower casing member and the corresponding forwardly curved end surfaces of backwall member 24. In accordance with the foregoing summary of the invention, it is important to note that the external diameter of winding core 13 is at least as great as the internal diameter of the film supply chamber, as shown by the substantially identical dimensions indicated by the respective reference letters X and X'.

Initially, most of the film and backing paper is wound within the film supply compartment as shown in FIGS. 3 and 6, with the leading end of the film and the corresponding portion of the paper extending through the film passageways. These passageways are just large enough to accommodate the film and paper without interfering with longitudinal movement thereof, thus minimizing the possibility of light entering the film chambers past the film and paper in the passageways. As disclosed in commonly assigned copending U. S. Pat. application Ser. No. 700,055, entitled "Method and Apparatus for Improving the Flatness of Roll Film in a Camera Exposure Aperture," filed in the name of Hubert Nerwin on Jan. 24, 1968, the film passageways preferably define a gradually curved film path between the film chambers and the back film gate surface 25, in order thereby to minimize distortive influences imparted to the film by abrupt curvature transitions.

Between the two opposed film passageways, the film and backing paper extend along the flat back gate surface 25 of the magazine wall member 24 between seating projections 47 and 48. These projections extend forwardly beyond surface 25 by a distance just slightly exceeding the combined thickness of the film and backing paper to provide coplanar seating surfaces 49 and 51 forwardly of and parallel to surface 25. Since these seating projections are located beyond the edges of the portion of the film and paper between the two passageways, it will be seen that frontal access to that portion of the film and paper is entirely unobstructed whenever the cartridge is removed from the camera.

The camera illustrated in FIGS. 4 and 6 includes an exterior housing comprising a front casing member 52 provided with a hinged rear cover door 53 adapted to close the housing when latched in the closed position partially illustrated in FIG. 6. An internal body member 54 is housed within the front casing member and includes a tapered rectangular opening 55 extending rearwardly from the cameras lens system and shutter, not shown, which are mounted in lens housing 56. Surrounding opening 55, the body member defines an open ended boxlike structure 57 provided with a pair of rearwardly facing support rails 58 and 59. The rearwardly facing front gate surfaces 61 and 62 defined by the respective support rails 58 and 59 are in coplanar relation to one another in a plane coincident with a focal plane to which the camera lens system focuses the image of an object within a given distance range from the camera.

When the cartridge is installed in the camera, its film supply and takeup compartments occupy corresponding receptacles 63 and 64 in the body member. These two receptacles are joined by horizontal channels 65 and 66 above and below the opening 55, such channels being adapted to accommodate the upper and lower wall members 29 and 18 of the cartridge so that the boxlike structure can be received between those two wall members and between the two film supply compartments. The cover door of the camera is provided with a pair of resilient spring members 67 above and below a transparent cover door window 68. When the cover door is closed, these spring members engage corresponding rearwardly facing surfaces of the magazine to urge the latter forwardly in the camera.

The various elements of the magazine and the internal camera structure which cooperate to support the cartridge and to define a light tight film gate between the two film compartments are disclosed in detail in the above-identified U.S. Pat. application Ser. No. 025,848. For purposes of the present disclosure, however, it will suffice to understand that the rearwardly facing surfaces 61 and 62 of the camera support rails 58 and 59 are engaged by the cartridge seating projections 47 and 48 under the influence of spring members 67, and that the edges of surfaces 61 and 62 adjacent opening 55 overlap the corresponding edge portions of the emulsion surface of the film extending between the two film compartments. Accordingly, since the seating projections extend forwardly beyond surface 25 by a distance barely exceeding the combined thickness of the film and paper, it will be apparent that front emulsion surface of the exposure portion of the film aligned with opening 55 is supported at the focal plane of the camera lens system by the exposure gate structure comprising the forwardly facing cartridge surface 25 and the rearwardly facing regions of support rails 58 and 59 overlapping the edges of the film.

The film-advancing system of the subject camera includes a winding key (not shown) which is adapted to engage the internal splines 72 at the upper end of winding core 13 when the cartridge is loaded into the camera. The winding key, in turn, is carried by rotatable winding shaft 73 attached to winding knob 74 shown in FIG. 4, whereby the manual rotation of the knob in a counterclockwise direction winds film and paper onto the core. The winding key is, of course, movable into and out of engagement with the winding core, either by manually operated means or by a mechanism of the type which automatically effects such movement in response to corresponding movement of the camera's cover door, as described in commonly assigned U. S. Pat. No. Re. 26,181.

As also disclosed in the above-identified pending U.S. Pat. application Ser. No. 025,956, the film-advancing system of the illustrated camera is provided with a film-metering mechanism operated by a metering pawl 82 projecting rearwardly through an opening 83 in upper support rail 59. When the cartridge is loaded into the camera, as previously described, this metering pawl engages the upper edge of the filmstrip in alignment with metering holes 35 and with a recess 84 in the back wall member of the cartridge, best depicted in FIG. 3. When the knob is first rotated to revolve the winding core, the resulting movement of the paper tends to effect corresponding movement of the film due to the frictional contact between the leading ends of the film and paper and also between the convolution of film and paper comprising the supply roll. Accordingly, as the paper winds onto the winding core, the leading end of the film enters the nip between the paper and the core and also is wound onto the core beneath the paper. During further rotation of the core, the tension developed in the convoluted film and paper thereon snubs the film tightly to the core so that it is, in effect, securely attached thereto. Thereafter, as the film is advanced, the metering pawl enters each successive metering opening in the film to a depth limited by the engagement of the slanted rearward edge of the pawl with the adjacent edge of the metering hole in which it is partially received. Each time the pawl thus enters a film perforation, the resulting sidewise movement of the pawl by the film operates a blocking mechanism which prevents further advancement of the film until an exposure has been made by depressing a shutter operating button, not shown. As is well known in the photographic art, the metering mechanism includes a double exposure prevention system which precludes a second operation of the shutter until the film has again been advanced. Whenever the film is moved to position the succeeding unexposed film area in alignment with the camera lens system, the concurrent movement of the backing paper brings the corresponding reference numeral 36 into alignment with aperture 26, where it can be viewed through the transparent window 68 in the camera cover door.

After all the available exposures have been made, i.e. 20 exposures along the filmstrip shown in FIG. 2, the further advancement of the film ultimately brings its trailing end past the metering pawl. Consequently, the pawl is able to move rearwardly past the film and through notch 34 in the backing paper into recess 84. This rearward movement of the pawl beyond the plane of the backing paper blocks the winding mechanism until the pawl is again moved forwardly by the installation of a fresh cartridge. Accordingly, the trailing end of the film and the corresponding portion of the backing paper remain in the film passageway of the film takeup compartment to prevent light from entering the takeup compartment via that passageway. Additionally, by thus preventing the film and backing paper from being wound entirely into the takeup chamber, this arrangement enables the film to be removed from the magazine for processing by being pulled out of the takeup chamber by means of the trailing end of the backing paper which remains accessible between the two cartridge compartments.

Since the illustrated winding core, itself, is substantially identical in diameter to the diameter of the largest film supply roll that can be accommodated within the film supply chamber, it should be obvious that somewhat more paper than film is produced between the two rolls throughout the entire winding operation regardless of the expansion of the film supply roll within the supply chamber and notwithstanding slippage between the film and paper. However, it should also be recognized that the same effect could be achieved by using a somewhat smaller winding core if a sufficient length of the leading end of the backing paper were wound around that core to increase its diameter to at least the maximum diameter of the outermost supply roll film convolution by the time the leading end of the filmstrip engages the core and starts to wind therein. For this reason, the term "effective" diameter as applied to the winding core refers to the internal diameter of the innermost film convolution wound thereon as determined both by the diameter of the core per se and also by the thickness of the convolutions of backing paper wound thereon ahead of the leading end of the filmstrip. Furthermore, it also should be apparent that the subject invention is equally applicable to conventional types of roll film magazines in which the leading end of the filmstrip is attached to the backing paper by means of a paster tab or the like. Of course, the invention is not limited to cylindrical winding cores. Thus, although the diameter of the core is frequently referred to, the term diameter also refers to equivalent characteristics of noncylindrical cores, such as ones which are prismatically shaped.

Moreover, it has been found that satisfactory results are achieved when a few convolutions of the film are included in the material initially wound about a winding core having a diameter somewhat smaller than the theoretical optimum before its diameter attains a dimension equal to at least the maximum diameter of the supply roll. For example, it was found that a cartridge having an internal supply chamber diameter of 0.750 inches and a winding core diameter of 0.700 inches, performed satisfactorily when film having a thickness of 0.006 inches and backing paper having a thickness of 0.004 inches were transported from the supply chamber to the takeup chamber. In the foregoing example, the leading end of the backing paper was wound on the supply core followed by two convolutions of film and paper, before the winding core and the material wound thereon reached a diameter equal to that of the supply chamber, i.e. 0.750 inches.

For this reason, it is to be understood that the invention also encompasses a winding core whose diameter is somewhat less than the theoretical optimum diameter discussed previously, provided that the diameter of the core including the thickness of the first few convolutions of film and paper wound thereon has a diametrical dimension equal to that of the supply roll as initially wound. Therefore, the term "effective" diameter additionally refers to the diametrical dimension of a winding core in a film cartridge according to the invention which includes not only the diameter of the winding core per se, but also the thickness of backing paper and the thickness of no more than the first few convolutions of filmstrip wound on the core.

The aforementioned relationship between the internal diameter $X'$ of supply chamber 41 and the external diameter $X$ of winding core 13 can be expressed in terms of the filmstrip and paper wound thereon, namely:

$$b_r \geq b_u$$

where $b_u$ = the radius of curvature of the outermost convolution of film and paper as initially wound in the supply chamber, and $b_r$ = the radius of curvature of the convolution of paper in the innermost convolution of both film and paper wound in the takeup chamber. The foregoing relationship must of course be modified when the "effective" winding core diameter includes a few convolutions of backing paper and/or filmstrip as explained above. Based on the empirical conclusions set forth previously, the relationship should be modified to:

$$b_r \geq .9 b_u$$

in the latter situation.

The invention has been described in detail with particular reference to a preferred embodiment thereof, but it will be understood that variations and modifications can be effected within the spirit and scope of the invention.

We claim:

1. A loaded roll film cartridge for use in a camera including a film-advancing mechanism, said cartridge comprising:
   a. a housing including compartment means defining an internal film supply chamber and an internal film takeup chamber spaced from one another by a wall member of said housing,
   b. internal surface means defining respective passageways leading into said film supply and takeup chambers,
   c. an elongate web of light protective material extending initially between said chambers through said passageways with its leading end located within said takeup chamber,
   d. an elongate strip of photographic film lying along and movable longitudinally with said web,
   e. a supply roll initially housed within said film supply chamber and comprising alternate convolutions of said web and said strip, and
   f. a winding core rotatably housed within said film takeup chamber and adapted to be rotated by the film-advancing mechanism of said camera when said cartridge is loaded therein, said winding core being attached to the leading end of said web and having an effective diameter at least as large as the maximum diameter of the outermost strip convolution on said supply roll as defined by the internal size of said supply chamber, whereby each revolution of said winding core as said strip and said web are wound thereon produces at least one unwinding revolution of said supply roll.

2. A loaded film cartridge according to claim 1 in which said film supply chamber is of generally cylindrical internal configuration, said winding core per se being of a diameter substantially equal to that of said film supply chamber.

3. A loaded film cartridge according to claim 1 in which the leading end portion of said strip of film extends initially out of said supply chamber through the passageway leading thereto and along the passageway leading into said takeup chamber.

4. A loaded film cartridge according to claim 1 in which said strip is only attached to said web by frictional contact therewith.

5. A loaded roll film cartridge comprising:
   a. a housing including compartment means defining an internal film supply chamber and an internal film takeup chamber spaced from one another by a wall member of said housing,
   b. internal surface means defining respective passageways leading into said film supply and takeup chambers,
   c. an elongate web of light protective material extending initially between said chambers through said passageways with its leading end located within said takeup chamber,
   d. an elongate strip of photographic film lying along and movable longitudinally with said web in superimposed relation thereto,
   e. a supply roll initially housed within said film supply chamber and comprising alternate convolutions of said web and said strip, and
   f. a winding core rotatably housed in said film takeup chamber and engageable by a winding member of a camera to rotate said winding core within said chamber, said winding core being attached to the leading end of said web within said chamber and being of sufficiently large diameter relative to the internal dimensions of said supply chamber to insure that the diameter of the innermost convolution of said strip wound onto said core upon rotation thereof is at least as large as the diameter of the outermost convolution of said strip on the largest diameter supply roll that can be accommodated within said supply chamber, whereby each convolution of said winding core as said strip and said web are wound thereon produces at least one revolution of said supply roll.

6. A roll film cartridge comprising:
   a. a housing including compartment means defining a generally cylindrical internal film supply chamber and a generally cylindrical internal film takeup chamber spaced from one another by a wall member of said housing,
   b. internal surface means defining respective passageways leading into said film supply and takeup chambers, and
   c. a generally cylindrical winding core rotatably mounted in said takeup chamber, said winding core having an external diameter at least substantially as large as the internal diameter of said film supply chamber.

7. A roll film cartridge comprising:
a generally cylindrical supply chamber for holding alternate convolutions of wound film and backing paper, said chamber having an interior cylindrical wall defining the maximum radius of curvature of the outer convolution of the wound film and paper;
a generally cylindrical takeup chamber for receiving film and paper from said supply chamber and holding the film and paper in convolute form; and
means for limiting the minimum radius of curvature of the convolution of paper in the innermost convolution of both film and paper received by said takeup chamber so that $b_r$ is equal to or greater than $b_u$ where
$b_u$ = the radius of curvature of the outermost convolution of film and paper as initially wound in said supply chamber, and
$b_r$ = the radius of curvature of the convolution of paper in the innermost convolution of both film and paper held in said takeup chamber.

8. A cartridge according to claim 7 wherein said means for limiting the minimum radius of curvature of the convolution of paper in the innermost convolution of both film and paper received by said takeup chamber is a core having a radius $r$ equal to $b_u$.

9. A cartridge for a roll of photographic material, said cartridge comprising:
a supply compartment for housing unexposed photographic material;
a takeup compartment for receiving exposed photographic material;
a roll of photographic material comprising an elongate strip of backing paper and an elongate strip of photographic film in a superimposed relationship therewith, said roll being initially wound in said supply compartment and comprising alternate convolutions of said strip of backing paper and said strip of photographic film, and said roll as initially wound having an outermost convolution with a radius of curvature $b_u$; and
a winding core mounted for rotation in said takeup compartment for winding said photographic material thereabout in convolute form, said winding core having an effective diameter greater than the diameter of the core per se, the convolution of paper in the innermost convolution of both film and paper wound on said core having a radius of curvature $b_r$;
wherein $b_r$ is equal to or greater than $0.9\, b_u$.